July 7, 1959 L. GELB 2,893,206
PARKING BRAKE MECHANISM FOR AIRCRAFT
Filed April 27, 1954

INVENTOR
Ladislaus Gelb
BY:
Beau, Brooks, Buckley & Beau,
ATTORNEYS.

United States Patent Office 2,893,206
Patented July 7, 1959

2,893,206

PARKING BRAKE MECHANISM FOR AIRCRAFT

Ladislaus Gelb, Toronto, Ontario, Canada, assignor to John Gelb, Eggertsville, N.Y.

Application April 27, 1954, Serial No. 426,006

4 Claims. (Cl. 60—54.5)

This invention relates to certain new and useful improvements in brake mechanism for aircraft but more particularly to a parking brake mechanism therefor.

It has for one of its objects to provide a fluid pressure or hydraulically controlled parking brake of this character which is so designed and constructed as to positively and at all times maintain dynamic pressure on the fluid column of the brake system to compensate for any contraction or expansion of the fluid medium due to temperature differences.

Another object of the invention is to provide a parking brake actuating mechanism for aircraft which is simple and inexpensive in construction and safe and reliable in operation, and which is further so designed as to be readily installed in communicating relation with but operative independently of and without mechanical or hydraulic interference with the customary right and left wheel brake assembly now used on aircraft for controlling its landing.

Other features of the invention reside in the construction and arrangement of parts hereinafter described and particularly pointed out in the appended claims.

In the accompanying drawings.

Similar characters of reference indicate corresponding parts throughout the several views.

Figure 1:
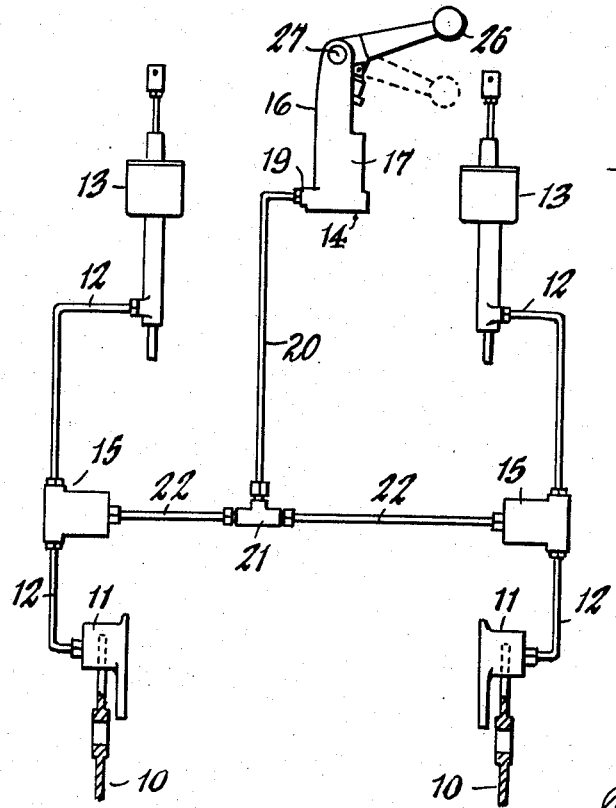
Figure 1 is a diagrammatic or elevational view showing my improved parking brake mechanism.

Referring now to the drawings showing the preferred embodiment of my parking brake mechanism in operative or communicating relation with a known type of wheel brake assembly now employed in connection with the right and left wheels of an airplane to control its landing, the numerals 10, 10 indicate the brake disks of such wheels, while each wheel-brake unit, which may be of any suitable and well known construction, is indicated at 11 and connected by a companion conduit 12 to a master cylinder 13 for providing fluid under pressure to apply the brakes through the medium of a suitable control pedal or the like (not shown).

The parking brake assembly, while hydraulically communicating with both conduits 12 leading to the wheel brake units 11, and operatively interposed between the latter and their master cylinders 13 to simultaneously apply both brakes for parking purposes, is so designed as to apply hydraulic pressure to both brake units independently of any pressure derived from the master cylinders and thereby eliminate any interflow of fluid when selectively applying the control or parking brake which might otherwise cause or contribute to a failure of either brake application. To this end I provide a manually-controlled, hydraulic pressure creating unit, indicated generally by the numeral 14, mounted in the cockpit of the airplane and operatively connected to right and left pressure transmitter units 15 connected to the conduits 12 leading to the companion wheel brake units 11, so that when this cockpit unit is placed in its operative or brake-applying position hydraulic pressure is simultaneously transmitted to the respective transmitter units and thence to the brake units.

Figure 2:
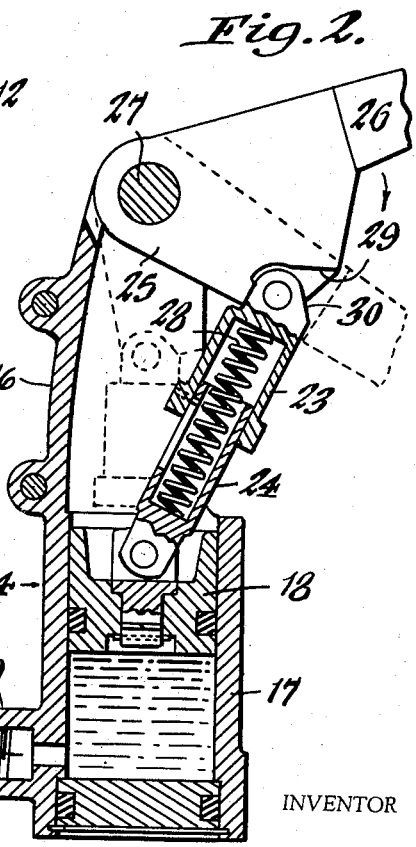
Figure 2 is an enlarged fragmentary sectional view of a control unit 14.

The pressure creating unit preferably consists of a housing 16 suitably secured in the cockpit of the plane and having a fluid-charged cylinder 17 in which a manually-actuated piston 18 operates. Adjacent its lower end the cylinder has a fluid outlet 19 which is connected by a conduit 20 to a T-connection 21 and by branch conduits 22 to the transmitter units 15. The piston is pivotally joined to one end of a spring-loaded toggle connection including relatively slidable telescoping tubular sections 23, 24, whose other end is pivotally connected to a lug or projection 25 formed on a vertically-swinging hand lever 26 fulcrumed axially of the cylinder on a bearing pin 27 secured to a bifurcated extension rising from the cylinder portion of the housing 16. Interposed between the opposing closed ends of the toggle-sections is a coil spring 28 which functions, when compressed, as in the operative or depressed position of the hand lever, shown by dotted lines in Figure 2, to constantly exert a dynamic pressure on the piston and the fluid column. In the depressed piston-lowered position of the hand lever, the toggle connection has its end pivots vertically aligned or on a dead center position with the axis of the lever-fulcrum 27 and with a stop shoulder 29 on the lever-lug 25 abutting against the opposing inclined face 30 of the toggle section 23, whereby the piston is effectually held or maintained in its lowered position with the then-compressed toggle-spring 28 continuing to exert a constant pressure on the piston and fluid column in the lines leading to the transmitter units 15 to apply the brakes for parking. By this lever-actuated, self-locking pressure creating means, dynamic pressure is always maintained on the fluid regardless of its expansion or contraction due to temperature variations.

Figure 3:
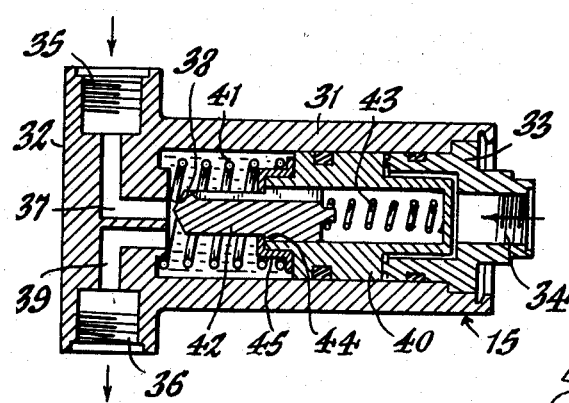
Figure 3 is an enlarged fragmentary sectional view of a transmitter unit 15.

In its preferred construction shown in Figure 3, each pressure transmitting unit, which is installed in interposed fluid comunication with the companion fluid conduit 12, consists of a cylinder 31 closed at its fluid-discharge end by an integrally formed head 32 and at its other or fluid intake end by a sealing plug 33 having a nipple 34 thereon to which the companion branch conduit 22 from the parking brake control unit 14 is connected. The cylinder head has diametrically-opposed openings 35 and 36 therein to which the adjoining inlet and outlet ends of the conduit 12 are connected for by-pass fluid communication with the adjacent end of the cylinder 31. The cylinder head opening 35, which is connected to the master cylinder, has an L-shaped port 37 leading therefrom and opening axially into the cylinder to define a valve-seat 38, while the opposing outlet opening 36, which is connected to the companion wheel brake unit 11, has a like-shaped port 39 leading therefrom and opening eccentrically into the cylinder. Operating in the cylinder is a fluid-tight piston 40 actuated in its forward or effective stroke by the fluid pressure created by the control unit 14 and having a light spring 41 interposed between its inner or forward end and the opposing cylinder-head 32. Slidably fitted in an axial bore provided in this piston and normally projecting forwardly therefrom to a point short of contact with the valve-seat 38 is a poppet valve 42. The latter is projected to such position by a spring 43 interposed between its inner end and the opposing end of the piston and to limit its projection the poppet valve has a forwardly-facing shoulder 44 thereon which abuts against a retainer ring 45 applied to the inner end of the piston and held in place thereon by the spring 41. By this construction, the poppet valve is properly positioned and retained on the piston, when retracted, to positively establish a constant space or clearance between the valve and the seat 38 of the port 37 comunicating with the master cylinder 13, so that when applying the wheel brakes in the normal control or maneuvering of the aircraft, the fluid from the master cylinder is uninterruptedly circulated through the conduit 12 and by-passed through the intercommunicating ports 37, 39 and cylinder 31 of the parking brake transmitter unit to the companion wheel brake unit 11. When the hand lever 26 of the parking brake unit 14 is depressed, the resulting fluid pressure created and that exerted constantly by the spring 28 against the piston 18 is transmitted to both transmitter units 15 to initially project each piston 40 thereof forwardly in its cylinder and its companion poppet valve 42 in a like direction and into spring-urged closed relation against the valve-seat 38 of the cylinder-head port 37 communicating with the companion master cylinder 13 to thereby automatically and positively shut off any transmission of fluid from the latter to the wheel brake unit 11. During the final stroke of the hand lever 26 the fluid pressure generated thereby is transmitted directly to each wheel brake unit from the companion cylinder 31 and cylinder-head port 39 through the conduit 12. Upon restoring the hand lever to its raised or pressure-released position, the piston 40 is returned to normal position by its spring 41 and its poppet valve 42 is automatically retracted to open the port 37 and re-establish the normally-operative fluid circuit from the master cylinder and through the transmitter unit cylinder 31 and its by-pass ports 37, 39 to the wheel brake unit. It will also be noted in this connection that there is no fluid interchange in the respective fluid circuits which independently govern the application of the wheel brakes for control or parking purposes.

This mechanism is also applicable to the rotor brake installation of helicopters and in such application the transmitter unit 15 is dispensed with and the pressure creating unit 14 is connected directly to the rotor brake to applying it for parking purposes.

I claim as my invention:

1. The combination with a brake for aircraft having an hydraulic wheel brake unit and a master control unit in fluid governing communication therewith, of a mechanism for independently actuating the wheel brake unit for aircraft parking purposes comprising a fluid dynamic pressure transmitting means adapted for interposition in the fluid line between the master control and wheel brake units and including a cylinder having a by-pass connection at one end for normally establishing interflow fluid communication therebetween and the master control and brake units and a fluid pressure inlet at its opposite end, a fluid pressure generating piston operable in said cylinder and having valve means thereon in governing relation to said by-pass connection to normally establish uninterrupted interflow fluid communication in the retracted position of the piston and to shut off the by-pass flow of fluid from the control unit to the brake unit during the advancing stroke of the piston and establish pressurized fluid communication directly from said cylinder to the brake unit, and a fluid pressure creating means including a cylinder in fluid comunication with the inlet of the cylinder of said pressure transmitting means, a piston freely movable in said cylinder, and a lever-actuated, self-locking connection for the piston having a yieldable energy storing spring means coupled between said connection and said piston for continuously exerting a dynamic pressure on said piston against the fluid when said connection is in its locked operative pressure creating position.

2. A parking brake mechanism for aircraft having hydraulic brake units for the landing wheels thereof, comprising a manually-actuated fluid dynamic pressure creating means, said pressure creating means including a toggle lever, having an open and closed position, a cylinder containing hydraulic fluid, a piston freely movable in said cylinder for applying continuous pressure to said fluid, spring means coupling said piston to said toggle lever, said toggle lever compressing said fluid and said spring means to exert a continuous dynamic pressure upon said fluid when in said closed position, a fluid pressure transmitting means in operative communication at one end to said pressure creating means and having a fluid-by-pass at its opposite end adapted for establishing communication therebetween and a source of fluid supply and a companion wheel brake unit, and normally-open valve means in operative governed relation to said pressure transmitting means for maintaining said by-pass open when said pressure creating means is in its brake-released position and for closing said by-pass when said last-named means is in its operative brake-applied position.

3. A parking brake mechanism for aircraft having an hydraulic brake unit for each of the landing wheels thereof, comprising a fluid dynamic pressure transmitting means having an inlet at one end for pressurized fluid and an outlet at its other end in fluid communication with the brake unit for actuating it, and a fluid pressure creating means including a cylinder having a piston freely operable therein and a fluid outlet communicating with the inlet of said pressure transmitting means, and a manually-actuated parking brake applying means including a self-locking connection for advancing said piston to its fluid pressure creating position and having a spring correlated therewith for constantly exerting a dynamic pressure on said piston in such position a toggle lever having a released position and a locked position, including a resilient, energy means coupling said toggle lever to said piston, said toggle lever being adapted to apply pressure to said piston when actuated and being responsive to engagement in the said locked position to store energy in said resilient means for maintaining a continuous dynamic pressure on said piston and said fluid.

4. A parking brake mechanism for aircraft having an hydraulic brake unit for each of the landing wheels thereof, comprising a fluid dynamic pressure transmitting means having an inlet at one end for pressurized fluid and an outlet at its other end in fluid communication with the brake unit for actuating it, and a fluid pressure creating means including a cylinder having a piston freely operable therein and a fluid outlet communicating with the inlet of said pressure transmitting means, a vertically-swinging piston-actuating lever fulcrumed axially of said cylinder, a telescoping, self-locking toggle connection between said lever and said piston, and a compression spring interposed between the telescoping elements of said toggle connection for exerting a constant pressure on said piston in the locked contracted position of such connection for continuously applying dynamic pressure to said brake mechanisms.

References Cited in the file of this patent

UNITED STATES PATENTS

| 1,991,603 | Dick | Feb. 19, 1935 |
| 2,148,268 | Kerr | Feb. 21, 1939 |
| 2,307,644 | Schlumbrecht et al. | Jan. 5, 1943 |
| 2,366,173 | Boldt | Jan. 2, 1945 |
| 2,486,046 | Majneri | Oct. 25, 1949 |
| 2,546,367 | Majneri | Mar. 27, 1951 |
| 2,765,625 | Hart | Oct. 9, 1956 |

FOREIGN PATENTS

| 405,073 | Great Britain | Feb. 1, 1934 |